US010289520B2

(12) United States Patent
West et al.

(10) Patent No.: US 10,289,520 B2
(45) Date of Patent: May 14, 2019

(54) ADAPTIVE APPLICATION PERFORMANCE ANALYSIS

(71) Applicant: New Relic, Inc., San Francisco, CA (US)

(72) Inventors: Todd West, San Francisco, CA (US); Graham Fuller, San Francisco, CA (US); Sebastian Ramirez, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 15/631,997

(22) Filed: Jun. 23, 2017

(65) Prior Publication Data

US 2018/0373612 A1  Dec. 27, 2018

(51) Int. Cl.
*G06F 9/44* (2018.01)
*G06F 11/36* (2006.01)
*G06F 11/34* (2006.01)
*G06F 11/30* (2006.01)

(52) U.S. Cl.
CPC ...... *G06F 11/3423* (2013.01); *G06F 11/3471* (2013.01); *G06F 11/3476* (2013.01); *G06F 11/302* (2013.01); *G06F 2201/865* (2013.01)

(58) Field of Classification Search
CPC ............. G06F 11/3636; G06F 11/3466; G06F 11/3644; G06F 11/3612; G06F 11/3409; G06F 11/323; G06F 2201/865; G06F 2201/86; G06F 2201/88; G06F 8/70; G06F 8/443
See application file for complete search history.

(56) References Cited

U.S. PATENT DOCUMENTS

| 8,443,080 | B2 * | 5/2013 | Ding | ........................ | G06F 9/54 |
| | | | | | 709/223 |
| 8,578,348 | B2 * | 11/2013 | Fliess | ....................... | G06F 8/70 |
| | | | | | 717/135 |

(Continued)

OTHER PUBLICATIONS

Li et al., Medic: metaprogramming and trace-oriented debugging, 8 pages (Year: 2015).*

(Continued)

*Primary Examiner* — Thuy Dao
(74) *Attorney, Agent, or Firm* — Fenwick & West LLP

(57) ABSTRACT

A system performs discovery and instrumentation of processes of an application based on process performance. The system includes one or more processors configured to: determine a duration score for a process indicating a relationship between a duration time for the process and a transaction time for a transaction including the process; determine an instrumentation threshold value; determine whether the duration score satisfies the instrumentation threshold value; and in response to determining that the duration score satisfies the instrumentation threshold value, instrument a second process invoked by the process to receive a second duration time for the second process when execution of the second process is detected in a second transaction trace of a second transaction. In some embodiments, the system prunes instrumented processes that primarily invoke subprocesses, and are thus unimportant for performance monitoring.

20 Claims, 10 Drawing Sheets

(56) References Cited

U.S. PATENT DOCUMENTS

| | | | | |
|---|---|---|---|---|
| 8,726,383 B2* | 5/2014 | Blackwell | ........... | G06F 11/3006 |
| | | | | 713/164 |
| 9,208,054 B2* | 12/2015 | Prasad | ................ | G06F 11/3604 |
| 9,619,375 B2* | 4/2017 | Avgerinos | ........... | G06F 11/3608 |
| 9,875,333 B1* | 1/2018 | Verma | ................ | G06F 17/5031 |
| 9,934,131 B2* | 4/2018 | Kalech | ................ | G06F 11/3664 |
| 2004/0078691 A1 | 4/2004 | Cirne et al. | | |
| 2005/0265235 A1 | 12/2005 | Accapadi et al. | | |
| 2008/0162272 A1 | 7/2008 | Huang et al. | | |
| 2008/0306711 A1 | 12/2008 | Bansal | | |
| 2010/0131962 A1 | 5/2010 | Zakonov | | |
| 2012/0259793 A1* | 10/2012 | Umansky | ............... | G06Q 10/06 |
| | | | | 705/348 |
| 2017/0109268 A1* | 4/2017 | Liu | ..................... | G06F 11/3688 |

OTHER PUBLICATIONS

Cai et al., Diver: precise dynamic impact analysis using dependence-based trace pruning, 6 pages (Year: 2014).*

PCT International Search Report and Written Opinion, PCT Application No. PCT/US2018/031589, dated Oct. 1, 2018, 12 pages.

* cited by examiner

| Duration (ms) | Duration (%) | Segment | Drilldown | Timestamp |
|---|---|---|---|---|
| 3,010 | 100.00% | NettyUpstreamDispatcher | ⊚ | 0.000 s |
| 0 | 0.00% | HttpRequest Decoder.decode() | | 0.000 s |
| 1.0 | 0.03% | > 7 calls to RoutingContextImpl.request() | | 0.000 s |
| 3,010 | 99.93% | ∨ SimpleREST.handleGetProduct() | ⊚ | 0.001 s |
| 0 | 0.00% | RoutingContextImpl.request() | ⊚ | 0.001 s |
| 0 | 0.00% | > HttpServerRequestWrapper.getParam() | ⊚ | 0.001 s |
| 0 | 0.00% | RoutingContextImpl.response() | ⊚ | 0.001 s |
| 3,010 | 99.83% | SimpleREST.d() | ⊚ | 0.002 s |
| 0 | 0.00% | JsonObject.encodePrettily() | ⊚ | 3.011 s |
| 2.0 | 0.07% | > HttpServerResponseImpl.end(C) | ⊚ | 3.011 s |

ADAPTIVE APPLICATION PERFORMANCE ANALYSIS

BACKGROUND

This disclosure generally relates to performance monitoring of applications executing on computing systems.

Web-based and mobile applications are common tools for delivering content and services to user computing devices. These applications are executed by application servers, which provide content to the computing devices and respond to requests from the computing devices. To avoid disruptions in the functionality of an application, an application server may additionally execute a program such as an agent to monitor the server and application. Monitoring an application server enables an administrator of the server to verify the application server is running properly and detect performance issues in the application.

For example, a monitor can instrument a framework or application server executing application code of an application to generate a transaction trace. Such a transaction trace can reveal potential performance problems with instrumented code of the application server or framework, but not the performance of individual processes (e.g., functions or methods) of the application code. While it is possible to instrument the application code with custom instrumentation (e.g., prior to compiling and deploying the application, and such as by manually instrumenting particular processes of the code), this requires knowledge regarding which processes are causing performance problems.

SUMMARY

A system performs discovery and instrumentation of processes of an application based on process performance. In some embodiments, the system includes one or more processors (e.g., of a server) that generate a code graph of processes associated with one or more packages of the application, the code graph representing invocation relationships between the processes; instrument a process of the code graph to receive a duration time for the process when the process is executed. The one or more processors detect a transaction trace indicating execution of a transaction including the process, and determine a duration score for the process indicating a relationship between a duration time for the process and a transaction time for the transaction, an instrumentation threshold value, and whether the duration score satisfies the instrumentation threshold value. In response to determining that the duration score satisfies the instrumentation threshold value, the one more servers determine, based on referencing the code graph, a second process invoked by the process, and instrument the second process to receive a second duration time for the second process when execution of the second process is detected in a second transaction trace of a second transaction.

In some embodiments, the one or more processors of the system detect the second transaction trace indicating execution of the second transaction, the second transaction trace including the process and the second process with the first process invoking the second process. The one or more servers determine a second duration score for the second process indicating a relationship between a second duration time for the second process and the duration time for the process, and whether the second duration score satisfies the instrumentation threshold value. In response to determining that the second duration score satisfies the instrumentation threshold value, the one or more servers determine, based on referencing the code graph, a third process invoked by the second process, and instrument the third process to receive a third duration time for the third process when execution of the third process is detected in a third transaction trace of a third transaction.

In some embodiments, the one or more processors of the system detect the third transaction trace indicating execution of the third transaction, the third transaction trace including the process, the second process, and the third process, the first process invoking the second process, the second process invoking the third process. The one or more servers determine a third duration score for the third process indicating a relationship between the third duration time for the third process and the second duration time for the second process, a pruning threshold value, and whether the third duration score satisfies the pruning threshold value. In response to determining that the third duration score satisfies the pruning threshold value, the one or more servers uninstrument the second process to cause the second process to not return the second duration time for the second process when execution of the second process is detected in a fourth transaction trace of a fourth transaction.

Some embodiments may include a method for monitoring an application. The method includes generating a code graph of processes associated with one or more packages of the application executing, the code graph representing invocation relationships between the processes, and instrumenting a process of the code graph to receive a duration time for the process when the process is executed. The method further includes monitoring the application to detect a transaction trace indicating execution of a transaction including the process. The method further includes determining a duration score for the process indicating a relationship between a duration time for the process and a transaction time the transaction, an instrumentation threshold value, and whether the duration score satisfies the instrumentation threshold value. In response to determining that the duration score satisfies the instrumentation threshold value, the method includes determining, based on referencing the code graph, a second process invoked by the process, and instrumenting the second process to receive a second duration time for the second process when execution of the second process is detected in a second transaction trace of a second transaction.

Some embodiments include a non-transitory computer readable medium storing instructions that when executed by a processor configures the processor to execute the methods for monitoring an application as discussed herein.

BRIEF DESCRIPTION OF THE FIGURES

FIG. 10 is an example of an information display 1000 of a transaction trace, in accordance with some embodiments The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
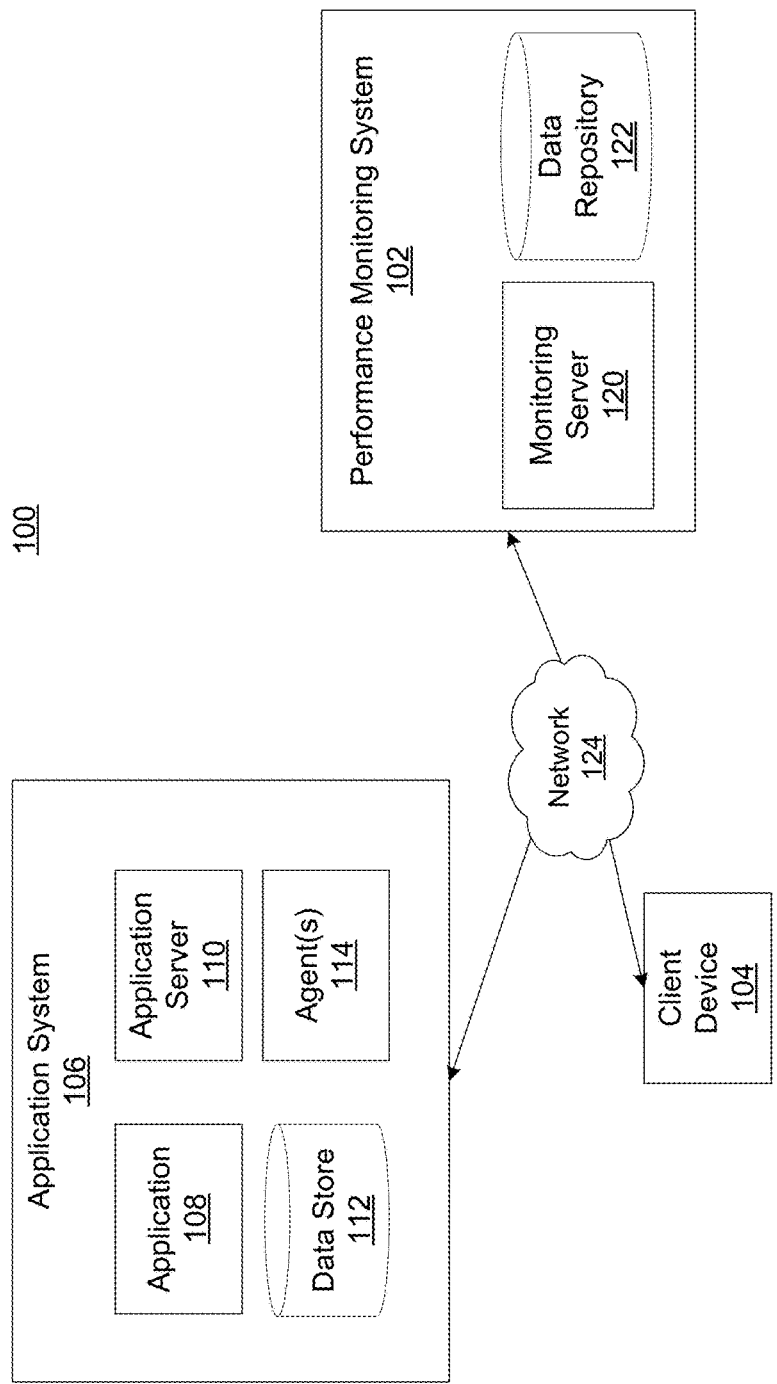
FIG. 1 is a block diagram of a system environment including a performance monitoring system, in accordance with some embodiments.

FIG. 1 is a block diagram of a system environment 100, in accordance with some embodiments. The system 100 includes a performance monitoring system 102, an application system 106, and a client device 104 that communicate over a network 124 (e.g., the Internet). The performance monitoring system 102 monitors and analyzes the performance of applications 108 executed by one or more servers 110 of the application system 106.

The application system 106 includes one or more application servers 110 and one or more data stores 112. The data store 112 stores application data for the applications 108 executed by the one or more application servers 110. The application server 110 further executes one or more agents 114 that monitors performance of the application 115, such as processes running on the application server 110, response time of the application 108, transactions in the application 108, processes of transactions in the application 108, the effect of backend processes on performance of the application 108 at client devices 104, statistics of a virtual machine running the application 108, or other information. In one embodiment, the agent 114 links the performance information to code paths in the application 108. The code path can identify, among other things, the package and process being executed in the application 108. The agent 114 collects and stores data relevant to performance of the application 108, and periodically reports the data to the monitoring server 140.

The application 108 may be any of a variety of types of mobile applications or web applications, and may represent a subset of operations of a client-server application. For example, the application 108 operated by the application server 110 may include any server-side processes of a client-server application, such as retrieving and storing database content, generating user interfaces for rendering at the client device 104, performing functions requested at the client device 104, and communicating content to the client device 104 (e.g., over the network 124). Although an application server 110 is shown in FIG. 1, the application server 110 may comprise one or more computing devices executing the functions of the application 108.

In some embodiments, the application server 110 includes a computing device executing a Java virtual machine that executes processes of the application 108. The virtual machine provides an environment for running the application 108, and manages objects created by the application 108 and a portion of data store 112 (e.g., a memory) used by the application 108. In particular, the virtual machine allocates memory by moving objects, including variables or data structures created during execution of the application 108 and agent 114, between pools of memory to efficiently manage the available memory of the system 106. The virtual machine also executes garbage collection processes to identify and remove objects no longer used or referenced in the application 108 to free up the memory occupied by the unused objects for storing other objects.

The performance monitoring system 102 includes one or more performance monitoring servers 120 (or "monitoring server 120") and one or more data repositories 122. The monitoring server 120 is an external computing device including one or more processors that monitor performance of the application server 110 via communication with the agent 114. The monitoring server 120 may be hosted by an application monitoring service provider, and may monitor performance of any number of application servers 110, including application servers 110 across different application systems 106.

To monitor the application server 110, the monitoring server 120 can provide the agent 114 to the application server 110 (e.g., as a software development kit or as a module integrated into the software of the application 115). While the application server 110 executes the agent 114, the monitoring server 120 communicates with the agent 114 to monitor performance of the application server 110. The monitoring server 120 receives reports for transaction traces of the application 108 from the agent 114 and generates informational displays for analysis by an administrator of the application server 110, enabling the administrator to address any performance issues in the application 108. For example, the monitoring server 120 generates tables, charts, or plots indicating transaction times for transactions or duration times for processes of the application 108. The informational displays can include transaction traces, defining processes invocation chains of a transaction, indications of slow or otherwise notable transactions or processes, and provides statistics from the server and/or virtual machine running the application 108.

Figure 2:
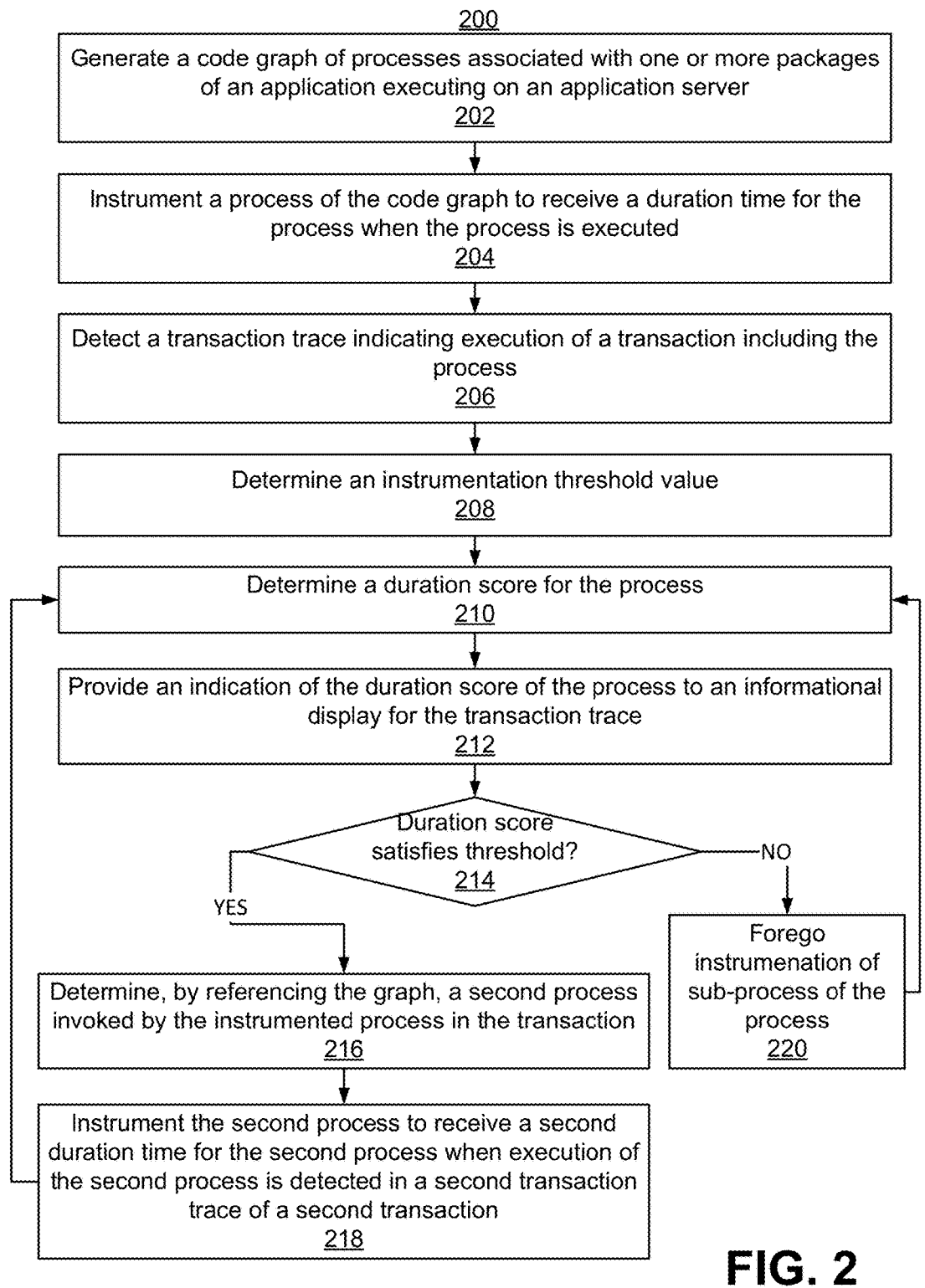
FIG. 2 is a flow chart of a method for discovering and instrumenting processes of an application executing on an application server, in accordance with some embodiments.

FIG. 2 is a flow chart of a method 200 for discovering and instrumenting processes an application 108 executing on an application server 110, in accordance with some embodiments. The method 200 provides for programmatic discovery of application processes of a transaction based on invocation relationships between the processes in a transaction trace. The transaction trace defines an execution stack of processes having invocation relationships. Method 200 analyzes the duration times of processes compared to their parent processes and continues down the execution stack to discover slow processes. In one embodiment, the steps of the process shown in FIG. 2 are performed by components of the system 100. The steps may be performed in different orders, and the method 200 may include different, additional, or fewer steps.

The monitoring server 120 generates 202 a code graph of processes associated with one or more packages of the application 108 executing on an application server 110. The code graph is a data structure representing the invocation relationships between processes of the transaction trace.

The application 108 can include many packages, each package including multiple processes (or "functions," or "methods"). A package can include a group of functionally related processes. In some embodiments, the packages being monitored can be selected, such as by user input or programmatically, for monitoring by the monitoring server 120. In some embodiments, the monitoring server 120 builds the code graph based on monitoring the code being executed on the application server 110, and filtering out processes and packages of the application 108 that are not selected for monitoring.

The monitoring server 120 instruments 204 a process of the code graph to receive a duration time for the process when the process is executed. This instrumentation is an initial instrumentation for a process of the code graph, and can be used as a root process for instrumentation sub-processes invoked by the process. In one example, one or more predefined processes are used as the initial instrumentation point. The instrumentation point may be a main process or method of the application, or some other process of interest.

In another example, the monitoring server 120 monitors the application 108 for transactions, and instruments each of the processes that belong to the one or more selected packages detected in the transactions. The application server 110 executes the application 108 to generate the transaction defined by a transaction trace indicating multiple processes of that invoke each other, their invocation relationships, and their duration times. The agent 114 detects the transaction trace and sends the transaction trace to the monitoring server 120. The monitoring server 120 filters out processes in the transaction trace that do not belong to the selected one or more packages, and performs the initial instrumentation on the processes in the transaction trace that belong to the selected one or more packages.

In some embodiments, the monitoring server 140 instruments a process by sending an instruction to the agent 114. The agent 114 adds an instrumentation point in the process that causes the process (or some other monitoring process) to return a duration time for the process to the agent 114 when the process is executed.

The monitoring server 120 detects 206 a transaction trace indicating execution of a transaction including the instrumented process. For example, the monitoring server 120 receives the transaction trace from the agent 114 when the application server 110 executes the transaction in the course of executing the application 108. The transaction trace can include an indication of each process in the transaction, and the invocation relationships between the processes.

In some embodiments, the monitoring server 120 compares each process to the processes of the code graph to identify instrumented processes belonging the monitored packages, and further processes each of the instrumented processes to selectively instrument invoked processes of the instrumented processes. For example, the class name and process name of the process can be compared with the class name and process names identified in the code graph.

The monitoring server 120 determines 208 an instrumentation threshold value. The instrumentation threshold value is used to determine whether a process should be instrumented. The instrumentation value threshold defines the value of the duration score that causes instrumentation of one or more sub-processes invoked by the instrumented process.

The monitoring server 120 determines 210 a duration score for the process indicating a relationship between a duration time for the process and a transaction time for the transaction. The transaction time defines a total execution time for the transaction, such as a time defined between a call of a first processes of the transaction trace and a response by a last process of the transaction trace. The duration time defines an execution time for the process, such as a time defined between a call of the process and a response by the process. The duration score can be calculated as a ratio of the duration time to the transaction time to represent a portion of the total transaction time used in executing the transaction that is used in executing the process. The monitoring server 120 determines duration score for the process based on determining the transaction time for the transaction, determining the duration time of the process, and calculating the duration score based on the transaction time and the duration time.

In some embodiments, the monitoring server 120 receives performance information, such as the transaction time and/or duration time, from the agent 114. In some embodiments, monitoring server 120 calculates the transaction time based on adding duration times for multiple processes executed in the transaction.

The monitoring server 120 provides 212 an indication of the duration score for the process to an informational display for the transaction trace. For example, the monitoring server 120 generates a user interface including the informational display. The user interface may include each instrumented process of the transaction that belongs to selected packages, and the duration score for instrumented process. The informational display may further include an indication of the invocation relationships between the processes.

The monitoring server 120 determines 214 whether the duration score satisfies the instrumentation threshold value. In some embodiments, the instrumentation threshold value is set at 0.20 (or 20 percent). Here, if the duration score (e.g., defined by the ratio of the duration time of the instrumented process and transaction time) exceeds 0.20, then the instrument threshold value is satisfied, and one or more processes invoked by the instrumented process in the transaction are also instrumented. In another example, the instrumentation threshold value is set at 0.4 (or 40 percent). The instrumentation threshold value can be adjustable, such as by user input or programmatically. A lower instrumentation threshold value can result in increased instrumentation of invoked processes and more process performance discovery, while a higher instrumentation threshold value can be used to limit data collection volume.

In response to determining that the duration score satisfies the instrumentation threshold value, the monitoring server 120 determines 216, based on referencing the code graph, a second process invoked by the instrumented process in the transaction. If the instrumentation threshold value is satisfied, then the second process takes up a significant portion of the duration time of the instrumented process, and thus the second process may also be a process of interest. The instrumented process can invoked multiple processes that each have duration times that satisfy the instrumentation threshold value. Instrumentation of a subclass allows deeper visibility regarding the transaction on the next transaction trace captured by the agent 114.

The monitoring server 120 instruments 218 the second process to receive a second duration time for the second process when the second process is executed in a second transaction. The second process may be detected in a subsequent transaction trace of a subsequent transaction.

In some embodiments, if the transaction (e.g., or parent process) has a third process at the same invocation level as the process detected at 206, the method 200 returns to 210, where the monitoring server 120 determines a duration score for the third process indicating a relationship between a duration time for the third process and the transaction time for the transaction. Similarly, a sub-process of the third process can be instrumented if the duration score for the third process satisfies the instrumentation threshold value.

Returning to 214, in response to determining that the duration score fails to satisfy the instrumentation threshold value, the monitoring server 120 forgoes 220 instrumentation of any sub-process of the instrumented process. The method 200 may return to 210, where the monitoring server 120 determines a duration score for another process of the transaction belonging to a selected package that is detected in the transaction trace. If the transaction does not include additional instrumented processes, the method 200 may end. If the transaction does include another instrumented process, steps 212-220 are performed to instrument a sub-process of the other instrumented process if the instrumentation threshold value is satisfied and provide the duration score of the other instrumented process to the informational display of the transaction trace.

The method 200 can be repeated for the second process, traversing the chain of invocation relationships of the transaction trace until all sub-processes of the second process that satisfy the instrumentation threshold value are instrumented.

Figure 3:
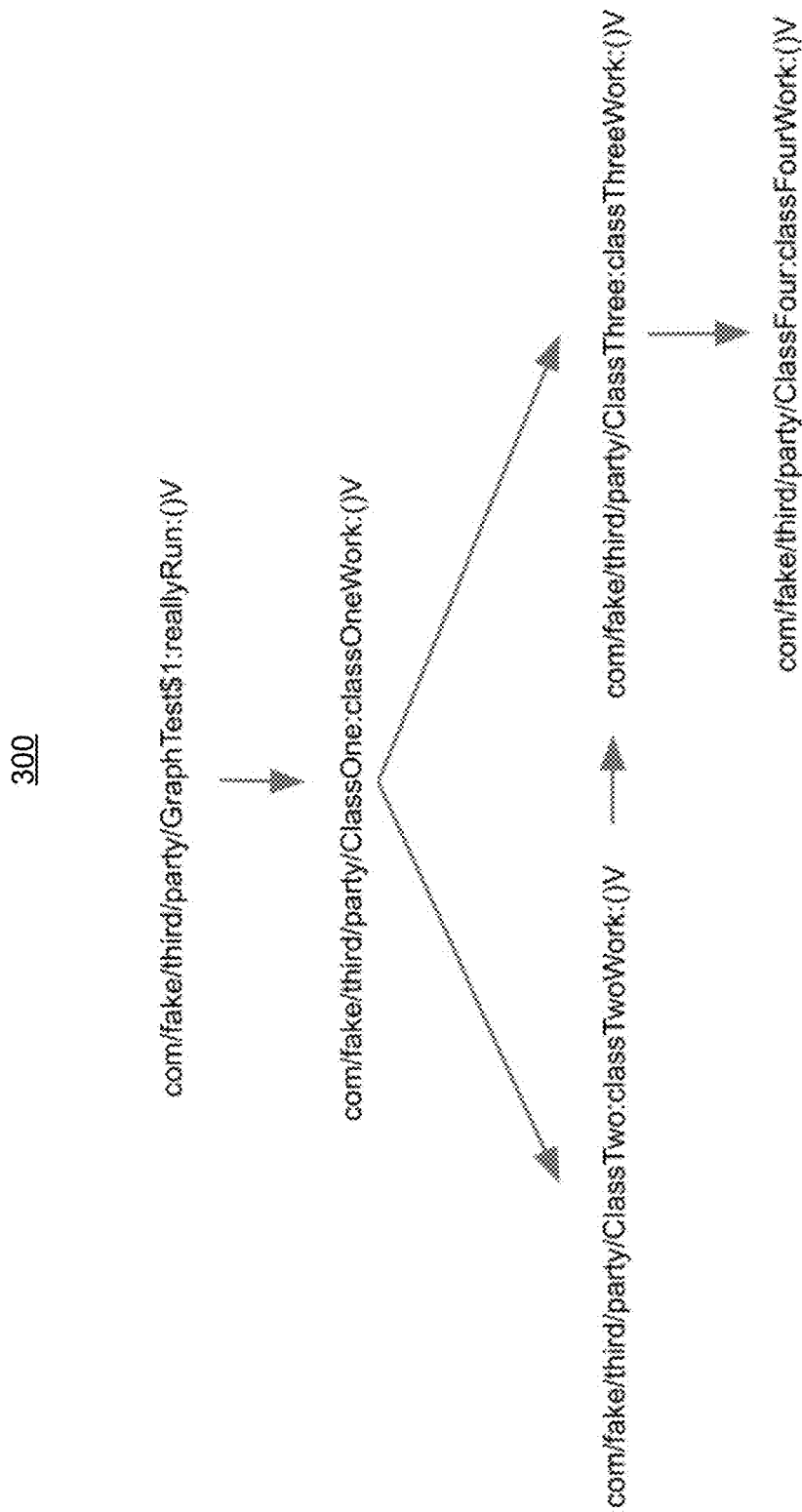
FIG. 3 is a schematic diagram of a code graph, in accordance with some embodiments.

FIG. 3 is a schematic diagram of a code graph 300, in accordance with some embodiments. The code graph 300 indicates invocation relationships between five processes of a package. Each process is referenced by a package namespace ("com/fake/third/party/"), a class name ("ClassTest$1," "ClassOne," "ClassTwo," "ClassThree," and "ClassFour"), and a process name ("reallyRun," "classOneWork," "classTwoWork," "classThreeWork," and "classFourWork"). The process reallyRun invokes the process classOneWork. The process classOneWork invokes the process classTwoWork and classThreeWork. The process classThreeWork invokes the process classFourWork.

Figure 4:
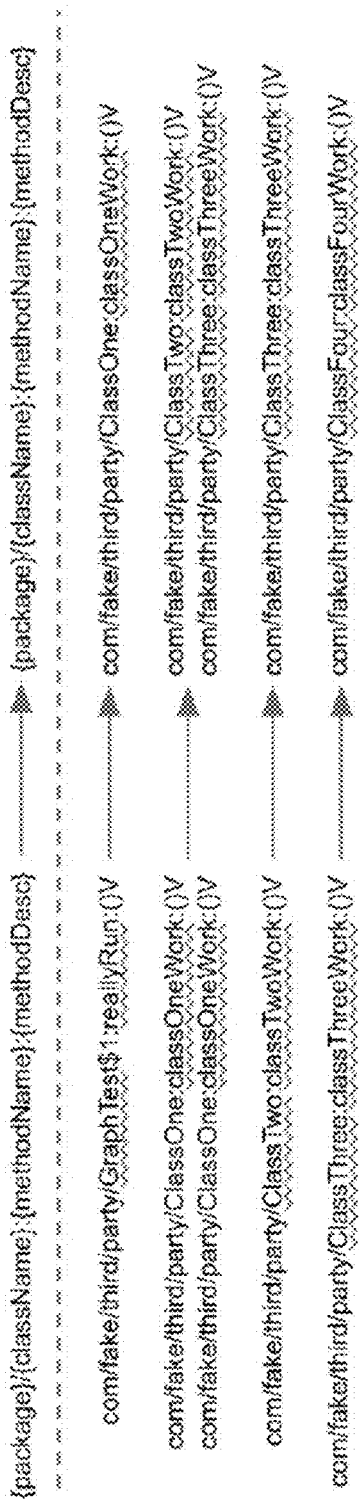
FIG. 4 is schematic diagram of a code graph, in accordance with some embodiments.

FIG. 4 is schematic diagram of a code graph 400, in accordance with some embodiments. The code graph 400 indicates in the same invocation relationships between the processes of the "come/fake/third/party/" package as shown by the code graph 300 in FIG. 3. Various types of data structure can be used to define or represent the code graph can.

Figure 5:
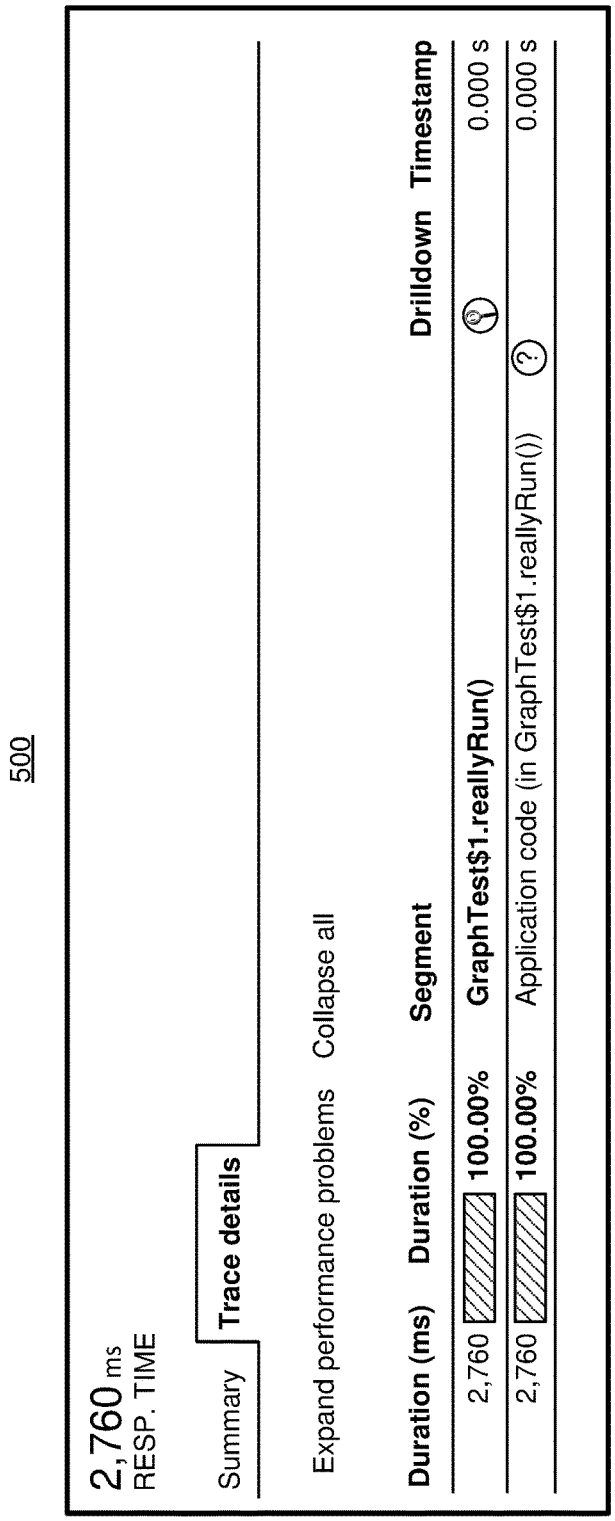
FIG. 5 is an example of an informational display of a transaction trace, in accordance with some embodiments.

FIG. 5 is an example of an informational display 500 of a transaction trace, in accordance with some embodiments. The informational display 500 can be provided to a user interface for presenting information regarding the processes of a transaction trace. As shown, the process reallyRun has a duration score of 1 (or duration %=100%), meaning that the reallyRun process is the highest level process of the transaction. The informational display 500 further indicates the duration time as 2,760 milliseconds.

Figure 6:
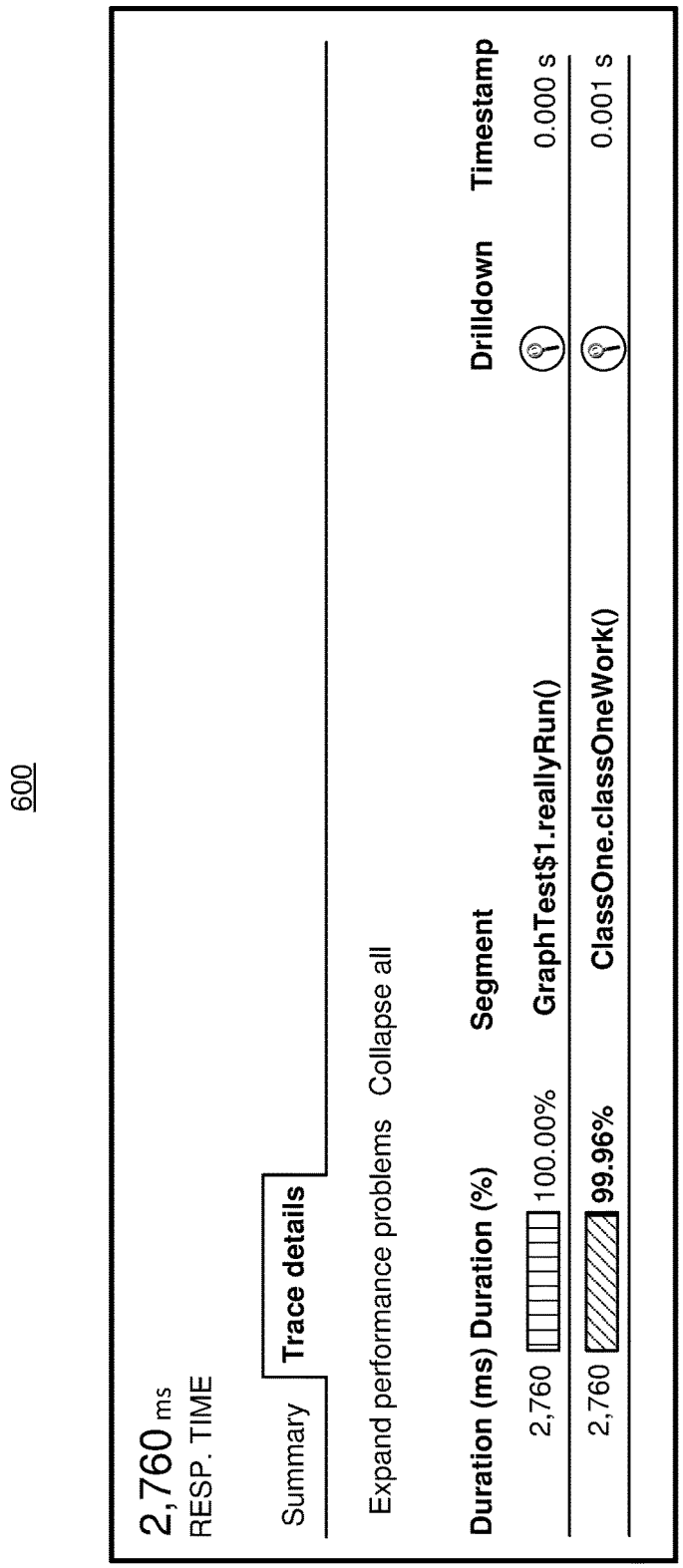
FIG. 6 is an example of an informational display of a transaction trace, in accordance with some embodiments.

FIG. 6 is an example of an informational display 600 of a transaction trace, in accordance with some embodiments. The informational display 600 includes an additional classOneWork sub-processes that is invoked by the reallyRun process. The duration score for the reallyRun process is 1 (or 100% duration relative to the total transaction). If the instrumentation threshold value is 0.4, then the duration score for the reallyRun process satisfies the instrumentation threshold value. As such, the subprocess classOneWork is also instrumented. When the reallyRun process is executed again as shown by the transaction trace of the informational display 600, the performance information such as duration score for the classOneWork is also provided to the informational display 600. Furthermore, because the classOneWork has a duration score of 1 (e.g., 100% duration of the invoking process reallyRun) that exceeds the instrumentation threshold value of 0.4, sub-processes of the classOneWork process can also be instrumented.

Figure 7:
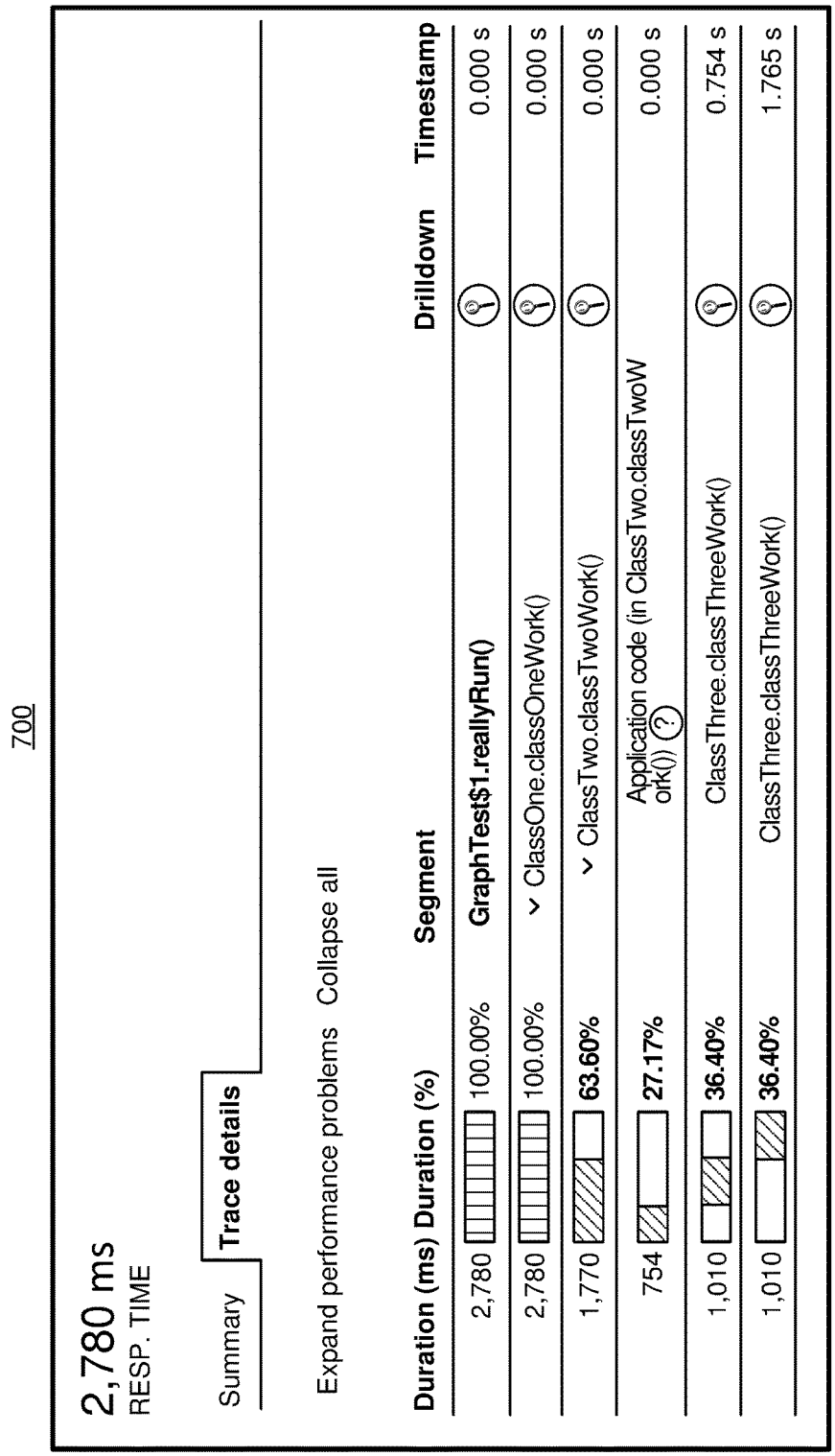
FIG. 7 is an example of an informational display of a transaction trace, in accordance with some embodiments.

FIG. 7 is an example of an informational display 700 of a transaction trace, in accordance with some embodiments. In a subsequent transaction trace, the duration score or other performance information for the instrumented sub-processes of the classOneWork are also presented to the informational display 700. In particular, the informational display 700 includes additional processes invoked by the classOneWork process, including classTwoWork and classThreeWork. Because classOneWork has a duration score of 1 which exceeds the 0.2, the sub-processes classTwoWork and classThreeWork are also instrumented. Furthermore, classTwoWork has a duration score of 0.636 (or 63.6% duration of the classOneWork duration time) which exceeds the instrumentation threshold value (e.g., or 0.4), and thus the sub-process classThreeWork is also instrumented. The informational display 700 further includes classThreeWork as a process invoked by classTwoWork. The duration score for each process, which is defined at each level as a ration of the duration time of the process to the duration time of the parent process invoking the process, is also presented in the informational display.

The processes classTwoWork, classThreeWork (as invoked by classTwoWork), and classThreeWork (as invoked by classOneWork) have duration scores of 0.636, 0.364, and 0.364 respectively. Although these duration scores each satisfy the 0.4 instrumentation threshold value, they are the lowest level processes in the informational display 700. For example, the processes may have no subprocesses, or their subprocesses may have been analyzed and each of the subprocesses had duration scores that failed to satisfy the instrumentation threshold value and are thus not instrumented. Thus, the discovery of sub-processes end at each of these processes for the transaction trace shown in the informational display 700.

Figure 8:
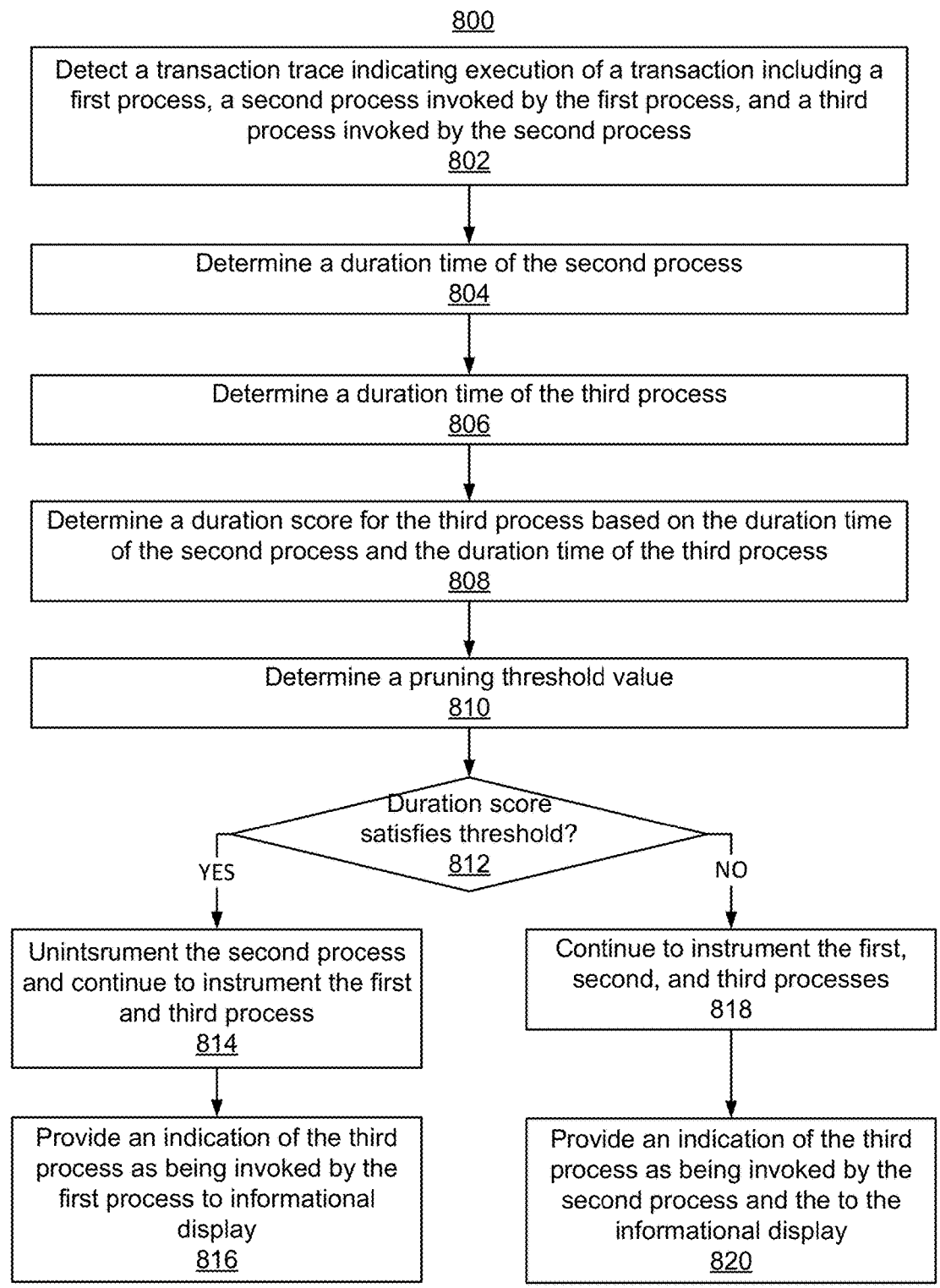
FIG. 8 is a flow chart of a method for pruning monitored processes of an application executing on an application server, in accordance with some embodiments.

FIG. 8 is a flow chart of a method 800 for pruning monitored processes of an application 108 executing on an application server 110, in accordance with some embodiments. The method 800 provides for programmatic uninstrumentation of intermediate processes in a transaction that function primarily to call a sub-process, and are thus less important in terms of performance monitoring. Among other advantages, long chains of processes that may be difficult to visualize and provide little value are excluded from monitoring and presentation to an informational display, and focuses the presentation on processes of importance (e.g., the slowest processes). In one embodiment, the steps of the method shown in FIG. 8 are performed by components of the system 100. The steps may be performed in different orders, and the method 800 may include different, additional, or fewer steps. In some embodiments, the method 800 is performed in connection with the method 200. In other embodiments, the method 800 is performed in a separate pruning task.

The monitoring server 120 detects 802 a transaction trace indicating execution of a transaction including a first process, a second process invoked by the first process, and a third process invoked by the second process. The first, second, and third processes are instrumented processes that are in a code graph and belong to packages of the application 108 selected for monitoring as discussed above in method 200. The first process may be the highest level process of the transaction trace, or may be an intermediate process that is invoked by a higher level process.

The monitoring server 120 determines 804 a duration time of the second process. The monitoring server 120 also determines 806 a duration time of the third process. Because the second process invokes the third process, the duration time of the third process is included within the duration time of the second process. The duration times for the second and third processes are returned from the agent 114 when the agent 114 reports the transaction trace to the monitoring server 114.

The monitoring server 120 determines 808 a duration score for the third process based on the duration times of the second and third process. For example, the duration score can be calculated based on a ratio of the duration time of the second process and the duration time of the third process.

The monitoring server 120 determines 810 a pruning threshold value. The pruning threshold value is used to determine whether a parent process should be uninstrumented.

The monitoring server 120 determines 812 whether the duration score satisfies the pruning threshold value. In some embodiments, the pruning threshold value is set at 0.95 (or 95 percent). If the duration score exceeds 0.95, then the pruning threshold value is satisfied. In another example, if the duration score fails to exceed 0.95, then the pruning threshold value is not satisfied. The pruning threshold value can be adjustable, such as by user input or programmatically. A lower pruning threshold value can result in increased pruning of parent processes to limit data collection volume and remove intermediate instrumentation when such instrumentation adds little or no value.

In some embodiments, a duration score for a process is compared with both the instrumentation threshold value and the pruning threshold value. When the instrumentation threshold value is satisfied, a child process invoked by the process is instrumented. When the pruning threshold value is satisfied, the parent process invoking the process is uninstrumented.

In response to determining that the duration score for the third process satisfies the pruning threshold value, the monitoring server 120 uninstruments 814 the second process and continues to instrument the first and second processes. For example, if the duration score of the third process is 0.99, which satisfies the 0.95 pruning threshold value, then the duration time of the second process is primarily used to execute the third process, thus rendering the second process unimportant in terms of performance monitoring.

In some embodiments, the monitoring server 140 uninstruments a process by sending an instruction to the agent 114. The agent 114 removes an existing instrumentation point in the process.

The monitoring server 120 provides 816 an indication of the third process as being invoked by the first process to an informational display. Furthermore, the informational display can include the duration scores or times of the first and third processes. The uninstrumented second process is omitted from the informational display.

Returning to 812, in response to determining that the duration score for the third process fails to satisfy the pruning threshold value, the monitoring server 120 continues to instrument 818 the second process. Thus, the first, second, and third processes continue to be instrumented.

The monitoring server 120 provides 820 an indication of the third process as being invoked by the second process to the informational display. The informational display includes an indication of the invocation relationships between the processes including the first process invoking the second process and the second process invoking the third process. The informational display can include the duration scores or times of the first, second, and third processes.

Method 800 can be repeated to uninstrument chain of multiple parent processes. For example, the steps 804-820 can be performed for the third process and the first process, and so forth.

Figure 9:
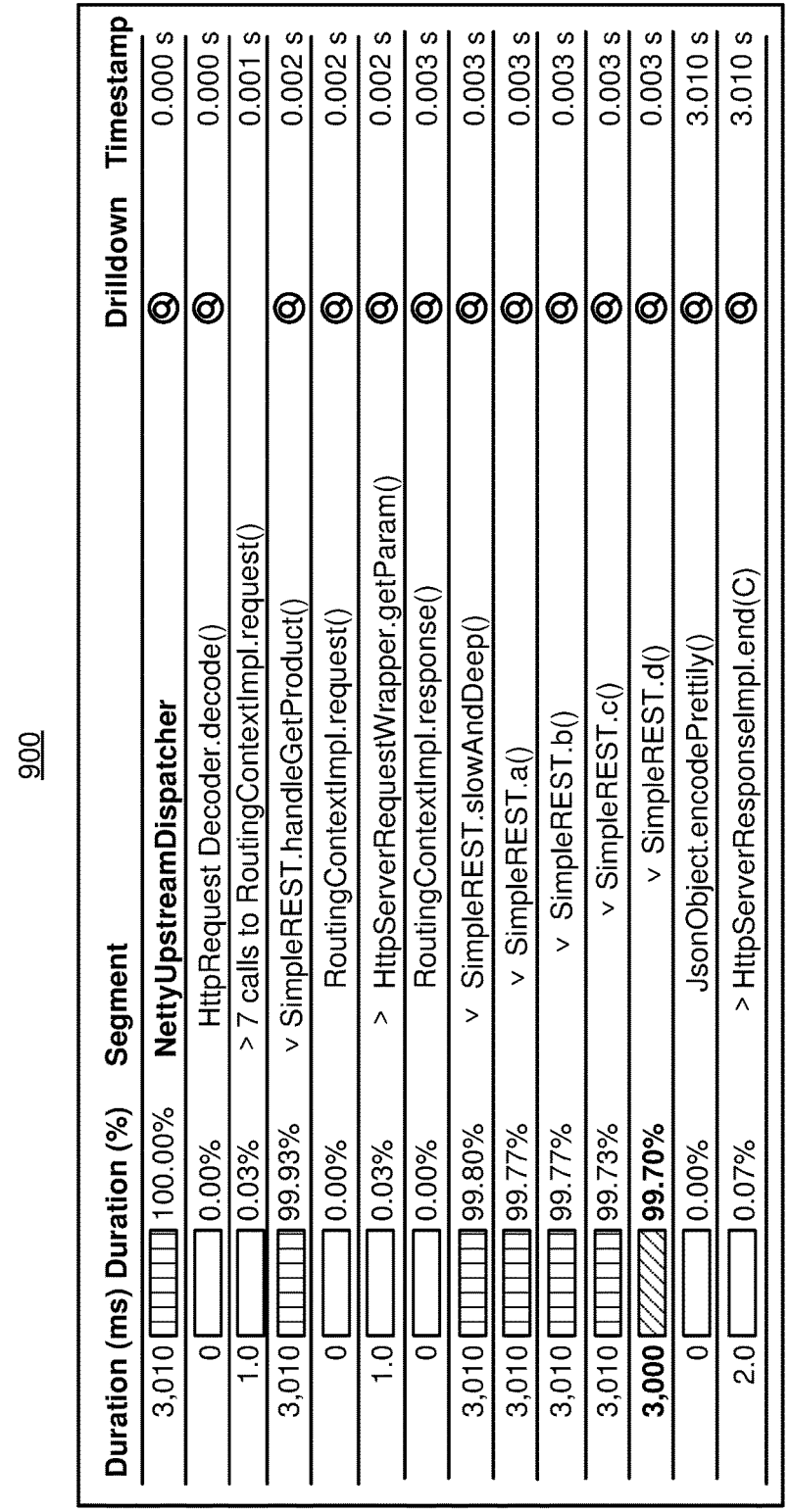
FIG. 9 is an example of an information display of a transaction trace, in accordance with some embodiments.

FIG. 9 is an example of an information display 900 of a transaction trace, in accordance with some embodiments. The information display 900 shows a process handleGetProduct (belonging to the class SimpleREST) that invokes a process slowAndDeep. The process slowAndDeep invokes the process a, which invokes the process b, which invokes the process c, which invokes the process d.

The duration score of process d relative to process c is 0.997 (or duration % of 99.70%), which exceeds and thus satisfies the pruning threshold value of 0.95. As such, the parent process c of the process d can be uninstrumented. With the process c pruned, the process d can be treated as sub-process of the process b, and a duration score for the process d relative to process b is calculated and compared with the pruning threshold value. This results in the process b being uninstrumented. The processes a and slowAndDeep are uninstrumented using the same technique.

FIG. 10 is an example of an information display 1000 of a transaction trace, in accordance with some embodiments. As a result of pruning and instrumenting the processes slowAndDeep, a, b, and c, the process d is presented in the informational display as being invoked by the parent process handleGetProduct, and the uninstrumented processes are not presented to the informational display 1000.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system for monitoring an application, comprising: one or more hardware processors configured to:
    generate a code graph of processes associated with one or more packages of the application, the code graph representing invocation relationships between the processes;
    instrument a process of the code graph to receive a duration time for the process when the process is executed;
    detect a transaction trace indicating execution of a transaction including the process;
    determine a duration score for the process indicating a relationship between a duration time for the process and a transaction time for the transaction;
    determine an instrumentation threshold value;
    determine whether the duration score satisfies the instrumentation threshold value;
    in response to determining that the duration score satisfies the instrumentation threshold value:
        determine, based on referencing the code graph, a second process invoked by the process; and
        instrument the second process to receive a second duration time for the second process when execution of the second process is detected in a second transaction trace of a second transaction;
    detect the second transaction trace indicating execution of the second transaction, the second transaction trace including the process and the second process with the first process invoking the second process;
    determine a second duration score for the second process indicating a relationship between a second duration time for the second process and the duration time for the process;
    determine whether the second duration score satisfies the instrumentation threshold value;
    in response to determining that the second duration score satisfies the instrumentation threshold value:
        determine, based on referencing the code graph, a third process invoked by the second process; and
        instrument the third process to receive a third duration time for the third process when execution of the third process is detected in a third transaction trace of a third transaction;
    detect the third transaction trace indicating execution of the third transaction, the third transaction trace including the process, the second process, and the third process, the first process invoking the second process, the second process invoking the third process;
    determine a third duration score for the third process indicating a relationship between the third duration time for the third process and the second duration time for the second process;
    determine a pruning threshold value;
    determine whether the third duration score satisfies the pruning threshold value; and
    in response to determining that the third duration score satisfies the pruning threshold value, uninstrument the second process to cause the second process to not return the second duration time for the second process when execution of the second process is detected in a fourth transaction trace of a fourth transaction.

2. The system of claim 1, wherein the one or more processors are further configured to:
    generate an informational display for the second transaction trace; and
    provide an indication of the process, the duration score of the process, the second process being invoked by the process, and the second duration score of the second process to the informational display.

3. The system of claim 1, wherein the one or more processors are further configured to:
    generate an informational display for the third transaction trace; and
    provide an indication of the duration score of the process, the third process being invoked by the process, and the third duration score of the third process to the informational display.

4. The system of claim 1, wherein the one or more processors are further configured to:
    generate an informational display for the transaction trace; and
    provide an indication of the process and the duration score of the process to the informational display.

5. The system of claim 1, wherein the one or more processors configured to instrument the second process includes the one or more processors being configured to send an instruction to an agent monitoring the application that causes the agent to inject a code into the second process that causes the second process to return the second duration time when the second process is executed.

6. The system of claim 1, wherein the one or more processors are further configured to receive the instrumentation score threshold value from a user input.

7. The system of claim 1, wherein the process belongs to a first package of the application and the second process belongs to a second package of the application different from the first package.

8. The system of claim 1, wherein the one or more processors are further configured to receive a selection of the one or more packages of the application from a user input and generate the code graph based on the user input, the one or more packages being a subset of all packages of the application.

9. The system of claim 1, wherein the one or more processors are further configured to, in response to determining that the duration score fails to satisfy the instrumentation threshold value, forgo instrumentation of the second process invoked by the process.

10. A method for monitoring an application, comprising:
    generating a code graph of processes associated with one or more packages of the application executing, the code graph representing invocation relationships between the processes;
    instrumenting a process of the code graph to receive a duration time for the process when the process is executed;
    monitoring the application to detect a transaction trace indicating execution of a transaction including the process;

determining a duration score for the process indicating a relationship between a duration time for the process and a transaction time the transaction;
determining an instrumentation threshold value;
determining whether the duration score satisfies the instrumentation threshold value;
in response to determining that the duration score satisfies the instrumentation threshold value:
  determining, based on referencing the code graph, a second process invoked by the process; and
  instrumenting the second process to receive a second duration time for the second process when execution of the second process is detected in a second transaction trace of a second transaction;
detecting the second transaction trace indicating execution of the second transaction, the second transaction trace including the process and the second process with the first process invoking the second process;
determining a second duration score for the second process indicating a relationship between a second duration time for the second process and the duration time for the process;
determining whether the second duration score satisfies the instrumentation threshold value;
in response to determining that the second duration score satisfies the instrumentation threshold value:
  determining, based on referencing the code graph, a third process invoked by the second process; and
  instrumenting the third process to receive a third duration time for the third process when execution of the third process is detected in a third transaction trace of a third transaction;
detecting the third transaction trace indicating execution of the third transaction, the third transaction trace including the process, the second process, and the third process, the first process invoking the second process, the second process invoking the third process;
determining a third duration score for the third process indicating a relationship between the third duration time for the third process and the second duration time for the second process;
determining a pruning threshold value;
determining whether the third duration score satisfies the pruning threshold value; and
in response to determining that the third duration score satisfies the pruning threshold value, uninstrumenting the second process to cause the second process to not return the second duration time for the second process when execution of the second process is detected in a fourth transaction trace of a fourth transaction.

11. The method of claim 10, further comprising:
generating an informational display for the second transaction trace; and
providing an indication of the process, the duration score of the process, the second process being invoked by the process, and the second duration score of the second process to the informational display.

12. The method of claim 10, further comprising:
generating an informational display for the third transaction trace; and
providing an indication of the duration score of the process, the third process being invoked by the process, and the third duration score of the third process to the informational display.

13. The method of claim 10, wherein instrumenting the second process includes sending an instruction to an agent monitoring the application that causes the agent to inject a code into the second process that causes the second process to return the second duration time when the second process is executed.

14. The method of claim 10, further comprising a selection of the one or more packages of the application from a user input and generating the code graph based on the user input, the one or more packages being a subset of all packages of the application.

15. The method of claim 10, further comprising, in response to determining that the duration score fails to satisfy the instrumentation threshold value, forgoing instrumentation of the second process invoked by the process.

16. A non-transitory computer readable medium storing instructions that when executed by a processor configures the processor to:
generate a code graph of processes associated with one or more packages of an application, the code graph representing invocation relationships between the processes;
instrument a process of the code graph to receive a duration time for the process when the process is executed;
monitor the application to detect a transaction trace indicating execution of a transaction including the process;
determine a duration score for the process indicating a relationship between a duration time for the process and a transaction time the transaction;
determine an instrumentation threshold value;
determine whether the duration score satisfies the instrumentation threshold value;
in response to determining that the duration score satisfies the instrumentation threshold value:
  determine, based on referencing the code graph, a second process invoked by the process; and
  instrument the second process to receive a second duration time for the second process when execution of the second process is detected in a second transaction trace of a second transaction;
detect the second transaction trace indicating execution of the second transaction, the second transaction trace including the process and the second process with the first process invoking the second process;
determine a second duration score for the second process indicating a relationship between a second duration time for the second process and the duration time for the process;
determine whether the second duration score satisfies the instrumentation threshold value;
in response to determining that the second duration score satisfies the instrumentation threshold value:
  determine, based on referencing the code graph, a third process invoked by the second process; and
  instrument the third process to receive a third duration time for the third process when execution of the third process is detected in a third transaction trace of a third transaction;
detect the third transaction trace indicating execution of the third transaction, the third transaction trace including the process, the second process, and the third process, the first process invoking the second process, the second process invoking the third process;
determine a third duration score for the third process indicating a relationship between the third duration time for the third process and the second duration time for the second process;
determine a pruning threshold value;

determine whether the third duration score satisfies the pruning threshold value; and in response to determining that the third duration score satisfies the pruning threshold value, uninstrument the second process to cause the second process to not return the second duration time for the second process when execution of the second process is detected in a fourth transaction trace of a fourth transaction.

17. The non-transitory computer readable medium of claim 16, wherein the instructions when executed by the processor further configures the processor to:

generate an informational display for the transaction trace; and provide an indication of the process and the duration score of the process to the informational display.

18. The non-transitory computer readable medium of claim 16, wherein the instructions that configures the processor to instrument the second process includes the instructions configuring the processor to send an instruction to an agent monitoring the application that causes the agent to inject a code into the second process that causes the second process to return the second duration time when the second process is executed.

19. The non-transitory computer readable medium of claim 16, wherein the process belongs to a first package of the application and the second process belongs to a second package of the application different from the first package.

20. The non-transitory computer readable medium of claim 16, wherein the instructions when executed by the processor further configures the processor to receive a selection of the one or more packages of the application from a user input and generate the code graph based on the user input, the one or more packages being a subset of all packages of the application.

* * * * *